United States Patent [19]

Yamamoto et al.

[11] Patent Number: 4,852,961
[45] Date of Patent: Aug. 1, 1989

[54] NONLINEAR OPTICAL WAVEGUIDE DEVICE INCLUDING GRATING FOR CHANGING OF THE WAVELENGTH OF LIGHT

[75] Inventors: Osamu Yamamoto, Nara; Toshihiko Yoshida, Tenri, both of Japan

[73] Assignee: Sharp Kabushiki Kaisha, Japan

[21] Appl. No.: 251,564

[22] Filed: Sep. 30, 1988

[30] Foreign Application Priority Data

Sep. 30, 1987 [JP] Japan .............................. 62-247623

[51] Int. Cl.⁴ .......................... G02B 6/34; H01S 3/10; H03F 7/00
[52] U.S. Cl. ............................. 350/96.19; 350/96.12; 350/96.13; 350/96.11; 372/21; 372/22; 307/427; 307/430
[58] Field of Search ............... 350/96.11, 96.12, 96.13, 350/96.14, 96.17, 96.19, 96.29; 372/21, 22, 23, 28; 307/425, 427, 430

[56] References Cited

U.S. PATENT DOCUMENTS

| | | | |
|---|---|---|---|
| 3,624,406 | 11/1971 | Martin et al. | 307/427 X |
| 3,660,673 | 5/1972 | Anderson | 350/96.10 |
| 3,831,038 | 8/1974 | Dabby et al. | 350/96.12 X |
| 3,842,289 | 10/1974 | Yariv et al. | 350/96.12 X |
| 3,871,742 | 3/1975 | Kaminow et al. | 350/96.17 |
| 3,898,585 | 8/1975 | Heidrich et al. | 350/96.19 |
| 4,427,260 | 1/1984 | Puech et al. | 307/427 X |
| 4,466,694 | 8/1984 | MacDonald | 350/96.19 |
| 4,497,535 | 2/1985 | Winful et al. | 350/96.12 |
| 4,583,818 | 4/1986 | Chen et al. | 350/96.19 |
| 4,796,971 | 1/1989 | Robello et al. | 350/96.29 X |

FOREIGN PATENT DOCUMENTS

| | | | |
|---|---|---|---|
| 61-144609 | 7/1986 | Japan | 350/96.19 |
| 612535 | 2/1979 | U.S.S.R. | 350/96.19 X |

OTHER PUBLICATIONS

Uesugi et al., "Efficient Second-Harmonic Generation . . . " Appl. Phys. Lett., vol. 29, No. 9, 11/76, pp. 572–574.

*Primary Examiner*—William L. Sikes
*Assistant Examiner*—Brian M. Healy
*Attorney, Agent, or Firm*—Irell & Manella

[57] ABSTRACT

A device for the changing of the wavelength of light comprising a non-linear optical crystal, first and second optical waveguides that are formed in the non-linear optical crystal, and an introducing means that is positioned adjacent to the second optical waveguide, the light being incident upon the first optical waveguide and propagated within the first optical waveguide, resulting in harmonic light that satisfies the phase-matching conditions, and the harmonic light being introduced, by the introducing means, into the second optical waveguide from which the harmonic light is output.

7 Claims, 3 Drawing Sheets

NONLINEAR OPTICAL WAVEGUIDE DEVICE INCLUDING GRATING FOR CHANGING OF THE WAVELENGTH OF LIGHT

BACKGROUND OF THE INVENTION

1. Field of the Invention

This invention relates to a device for the changing of the wavelength of light that is suitable for use in, for example, information processing devices that make use of laser light, apparatus for measurement with the use of light, and the like. More particularly, this invention relates to a device for shortening the wavelength of light. This shortening of the wavelength of the laser light used in, for example, optical disk systems, laser beam printers, and other such devices that make use of laser light, can result in higher performance.

2. Description of the Prior Art

In recent years, devices for information processing and the like that make use of semiconductor lasers, such as optical disk systems and laser beam printers, have been put into practical use. The laser light that is used in such systems as a light source has an oscillating wavelength of, for example, 780 μm or 830 μm. There is a proportional relationship between the wavelength of the laser light and the diameter of the light-focusing spot (the minimum light-focusing diameter), and the shorter the wavelength of laser light, the smaller the diameter of the light-focusing spot. The smaller the diameter of the light-focusing spot, the more possible becomes the increase in the recording density of, for example, an optical disk of an optical disk system, so that a laser beam printer can achieve greater resolution. Also, in the field of measurement with the use of light such as interference measurement and the like, the use of short wavelengths of laser light can increase the accuracy of the results of measurement. In such ways, the performance of devices that make use of laser light can be improved by the use of a device for the shortening of the oscillation wavelength of this light.

By the use of an InGaAlP system for the material of the semiconductor laser, it has been found experimentally that it is possible to obtain laser light with a wavelength in the region of 600 μm, but there are still a number of problems that remain concerning reliability and the like that must be solved before this is put into practical use. Also, at the present, materials for semiconductors that will give laser light of yet shorter wavelengths are not known.

Devices for the changing of the wavelength of light, i.e., the shortening of the wavelength of laser light, in general, produce a harmonic component with a wavelength of λ/n, wherein λ is the wavelength of laser light that is incident upon the said devices and n is an integer (e.g., 2, 4, 6, ... or 3, 6, 9, ...). At present, with the use of a YAG (yttrium-aluminium-garnet) laser with a wavelength of 1.06 μm, it is possible to produce laser light with a wavelength of 0.53 μm for green laser light, and with the use of a semiconductor laser with a wavelength of 0.83 μm, it is possible to produce laser light with a wavelength of 0.415 μm for blue laser light.

FIG. 6 shows a conventional device 10 for the changing of the wavelength of light, which has a non-linear optical crystal 1 such as the Z plate of crystals of $LiN_bO_3$ in which the direction of arrow A in FIG. 6 is in the direction of the crystal axis Z. In the upper portion of the non-linear optical crystal 1 shown in FIG. 6, an optical waveguide 2 with a width, for example, of 2 μm and a depth of 0.55 μm is formed from one side surface of the non-linear optical crystal 1 to the other side surface thereof by the proton exchange method or the like so as to be parallel with, for example, crystal axis Y.

In device 10 for the changing of the wavelength of light, for example, laser light 3 from a YAG laser or the like with a wavelength of 1.06 μm is fed into one facet of the optical waveguide 2 and proceeds along the inside of the optical waveguide 2. At this time, because the non-linear optical coefficient of the non-linear optical crystal 1 is large, a harmonic light 4 with a wavelength that is ½ of the wavelength of the laser light 3 (0.53 μm) is radiated inside of the non-linear optical crystal 1 at an angle θ that satisfies the phase matching conditions.

When YAG laser light (with a wavelength of 1.06 μm) is fed into $LiN_bO_3$ crystals, the harmonic light 4 is radiated at a 12.5° angle from the direction in which the YAG laser light is proceeding. This harmonic light 4, as shown in FIG. 6, is radiated along the entire region of the optical waveguide 2, and radiated out from the device 10 for the changing of the wavelength of light.

The harmonic component 4 is produced with an intensity in proportion to the second power of the intensity of the laser light that is fed in the device 10. For this reason, at the vicinity of the surface of the optical waveguide 2 into which the laser light is fed, the efficiency of the change from the long wavelength light into the harmonic light 4 is high and the laser light decays as it proceeds along the optical waveguide 2, resulting in a decrease in the efficiency of the change and a decrease in the intensity of the harmonic light 4. Moreover, because the harmonic light 4 is output from the narrow optical waveguide 2, diffraction causes the harmonic light 4 to expand in the direction of the width of the optical waveguide 2.

Therefore, the harmonic light 4 that is output takes on a narrow, long oval shape, and its intensity also is not uniform. This kind of light beam in an oval shape of non-uniform intensity is not suitable for use as a light source in optical disk apparatuses or laser printers. Moreover, because there is a fractional angle (of 12.5°) between the direction of the feeding in of laser light and the output of the harmonic light 4, the construction of a system with this kind of device 10 for the changing of the wavelength of light is complex.

In the conventional device 10 for the changing of the wavelength of light, the problems mentioned above limit the field of applications.

SUMMARY OF THE INVENTION

The device for the changing of the wavelength of light of this invention, which overcomes the above-discussed and numerous other disadvantages and deficiencies of the prior art, comprises a non-linear optical crystal, first and second optical waveguides that are formed in said non-linear optical crystal, and an introducing means that is positioned adjacent to said second optical waveguide, said light being incident upon said first optical waveguide and propagated within said first optical waveguide, resulting in harmonic light that satisfies the phase-matching conditions, and said harmonic light being introduced, by said introducing means, into said second optical waveguide from which said harmonic light is output In a preferred embodiment, the introducing means is a grating layer with a diffraction grating period.

In a preferred embodiment, the introducing means is a tapered coupler.

In a preferred embodiment, the diffraction grating period of said grating layer is selected so as to satisfy the following equation:

$$n_S \sin \theta_1 = N + \frac{\lambda}{\Lambda} q \qquad (1)$$

wherein $\Lambda$ is the diffraction grating period of said grating layer, $\theta$ is the incident angle at which said harmonic light is incident upon said grating layer, $\lambda$ is the wavelength of said harmonic light, $n_S$ is the refraction index of the atmosphere, and N is the refraction index of said grating layer.

The device of this invention comprises a cladding layer, as desired, that is positioned on the grating layer. In this construction $n_S$ becomes the refraction index of said cladding layer.

In another embodiment, the refraction index N of said grating layer and the diffraction grating period $\Lambda$ of the grating layer further satisfy the following relationship:

$$N + n_S > \lambda/\Lambda > N \qquad (2)$$

Thus, the invention described herein makes possible the objective of providing a device for the changing of the wavelength of light by which the light that is fed into the said device is changed to harmonic light with a desired optical-intensity distribution and the harmonic light is emitted in a desired direction.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

This invention provides a device in which light comes into a first optical waveguide, formed in a non-linear optical crystal, which gives rise to harmonic light at an angle that satisfies the phase-matching conditions within the non-linear optical crystal. The said harmonic light is introduced into a second optical waveguide by means of an introducing means, and in this second optical waveguide, the light is propagated, collected and output from the said second optical waveguide.

EXAMPLE 1

Figure 1:
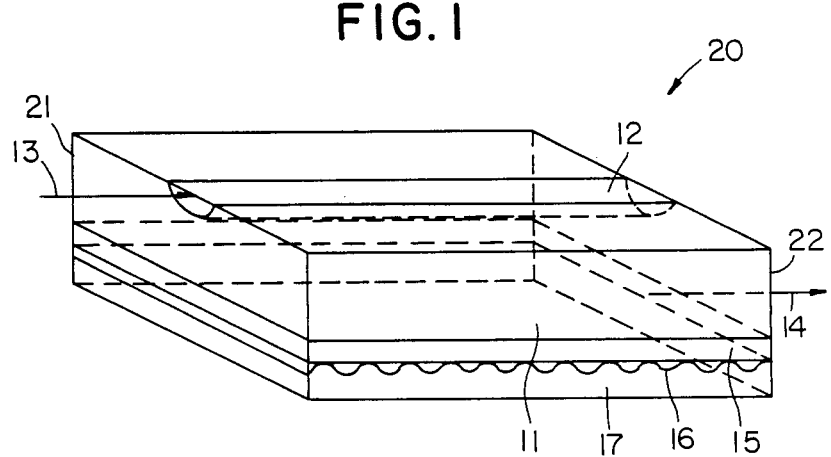
FIG. 1 is a perspective view showing a device for the changing of the wavelength of light of this invention.

FIG. 1 shows a device 20 for the changing of the wave-length of light of this invention, which comprises a non-linear optical crystal 11 that is made of a crystal Z-board of $LiNbO_3$ or the like, a first optical waveguide 12 that is formed in the non-linear optical crystal 11, a second optical waveguide 15 that is also formed in the non-linear optical crystal 11, and a grating layer 16 that has a surface adjacent to the second optical waveguide 15. In the device 20, for example, YAG laser light 13 with a wavelength of 1.06 $\mu$m, or the like is fed into the device, and harmonic light 14 that is green and has a wavelength of 0.53 $\mu$m is output therefrom.

The optical waveguide 12 is formed in the upper portion of the non-linear optical crystal 11 from the light-input facet 21 to the light-output facet 22 by using changes in the diffraction ratio caused by the exchange of protons by the proton-exchange method or the like in the non-linear optical crystal 11. This optical waveguide 12 has a width, for example, of 2 $\mu$m and a depth of 0.55 $\mu$m.

The optical waveguide 15 is formed by a proton-exchange method or the like in the lower portion of the non-linear optical crystal 11. In the bottom portion of the optical waveguide 15, there are layered a grating layer 16 and a cladding layer 17. The grating layer 16 that makes up the diffraction grating is formed on the top of the optical waveguide 15 by plasma assisted chemical vapor deposition as follows:

In this example, SiN is formed on the top of the optical waveguide 15 and a photo-resist is coated on the SiN. Then, the photo-resist is exposed to light by the holographic exposing method, followed by development, etching, and removal of the photo-resist in a series of steps, in that order. The cladding layer 17 is formed by sputtering of, for example, $SiO_2$.

Figure 2:
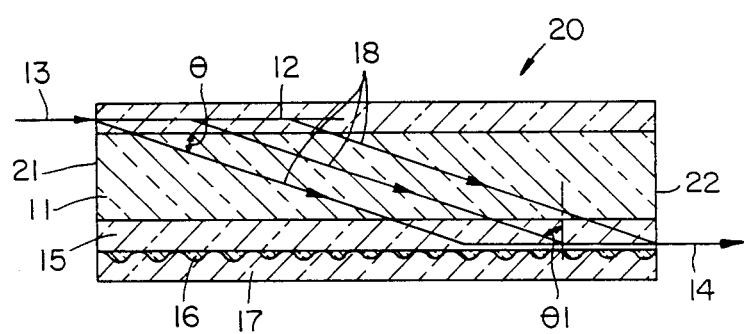
FIG. 2 is a sectional view showing the device of FIG. 1.

Below, the functioning of the device 20 of FIG. 1 will be explained by reference to FIG. 2.

Laser light 13, which is YAG laser light or the like, is fed into the light-input facet 21 of the optical waveguide 12 so that the laser light 13 becomes parallel to the optical waveguide 12, and proceeds along inside of the optical waveguide 12. Because the non-linear optical coefficient of the non-linear optical crystal 11 is large, harmonic light 18 with a wavelength that is $\frac{1}{2}$ times the wavelength of the laser light 13 is radiated inside the non-linear crystal 11 at an angle $\theta$ that satisfies the phase-matching conditions. This harmonic light 18 is introduced into the optical waveguide 15 by the grating layer 16.

The grating period $\Lambda$ of the grating layer 16, the incident angle $\theta$ at which the harmonic light 18 is incident upon the grating layer 16, the wavelength $\lambda$ of the harmonic light 18, the refraction index $n_S$ of the cladding layer 17, and the refraction index N of the grating layer 16 can be selected by the following formula so as to satisfy the relationship shown here.

$$n_S \sin \theta_1 = N + \frac{\lambda}{\Lambda} q \qquad (1)$$

wherein q is an integer that can be set freely. By the grating layer 16 that is formed to have a grating period $\Lambda$ that satisfies the above-mentioned relationship, the harmonic light 18 is efficiently introduced into the optical waveguide 15.

In this way, the harmonic light 18 that is produced in all regions of the optical waveguide 12 is introduced into the optical waveguide 15 and output from the optical waveguide 15 to the outside, so that the degree of ovality is small, and the output light 14, which has a satisfactory intensity distribution, is output in the same direction as it was fed into the device.

In this example, when the light-input facet 21 where laser light 13 is fed into the device, is coated with a substance by which the laser light 13 with a wavelength of 2λ is reflected at a low reflectivity, but the harmonic light 18 with a wavelength of λ is reflected at a high reflectivity and when the light-output facet 22 is coated with a substance by which the laser light 13 with a wavelength of 2λ is reflected at a high reflectivity, but the harmonic light 18 with a wavelength of λ is reflected at a low reflectivity, the exchange-efficiency from the incident light 13 into the harmonic light 18 is increased, and leakage of the incident light 13 is prevented.

EXAMPLE 2

Figure 3:
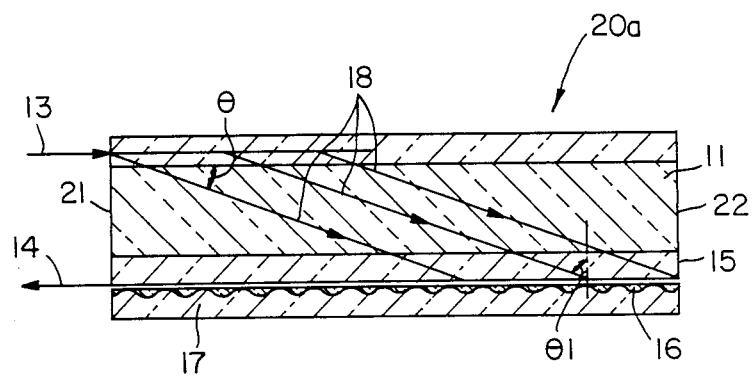
FIG. 3 is a sectional view showing another device for the changing of the wavelength of light of 10 this invention.

FIG. 3 shows another device 20a of the changing of the wavelength of light of this invention, which has the same structure as mentioned in Example 1, except that not only Equation 1 mentioned above is fulfilled, but also the relationship between the refraction index N of the grating layer 16 and the grating period Λ is represented by the following equation:

$$N + n_S > \lambda/\Lambda > N \qquad (2)$$

The grating layer 16 functions as a backward-type grating connector, which gives rise to an output light 14 that proceeds in the opposite direction but parallel to the laser light 13 that is fed into the device 20a for the changing of the wavelength of light.

EXAMPLE 3

Figure 4:
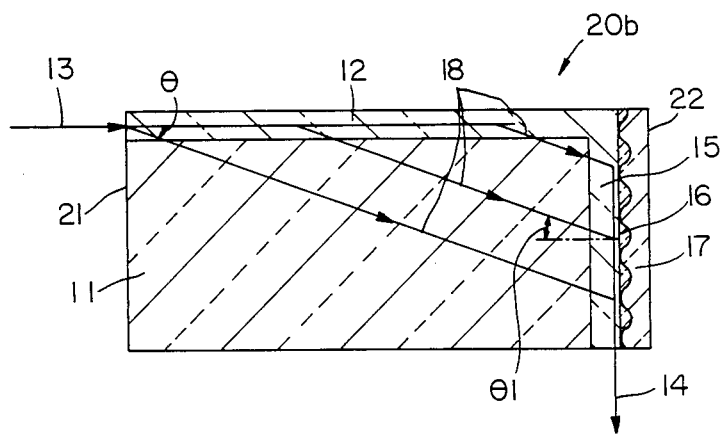
FIG. 4 is a sectional view showing another device for the changing of the wavelength of light of this invention.

FIG. 4 shows anther device 20b for the changing of the wavelength of light, which comprises a non-linear optical crystal 11, first and second optical waveguides 12 and 15, a grating layer 16, and a cladding layer 17. The first optical waveguide 12 is formed in the non-linear optical crystal 11 in the same way as that of the device 20 of Example 1. The second optical waveguide 13 is formed by the proton-exchange method mentioned above at the facet 22 that is opposite to the light-input facet 21 on which the laser light is incident. The grating layer 16 is formed by the method described above on the surface of the optical waveguide 15 so that the grating period Λ fulfills the relationship shown in Equation 1. The cladding layer 17 is formed by being layered on the grating layer 16. By this kind of device 20b, output light 14 can be obtained that proceeds in the downward direction in FIG. 4, at a 90° angle with respect to the laser light 13 that is incident upon the device 20b.

EXAMPLE 4

Figure 5:
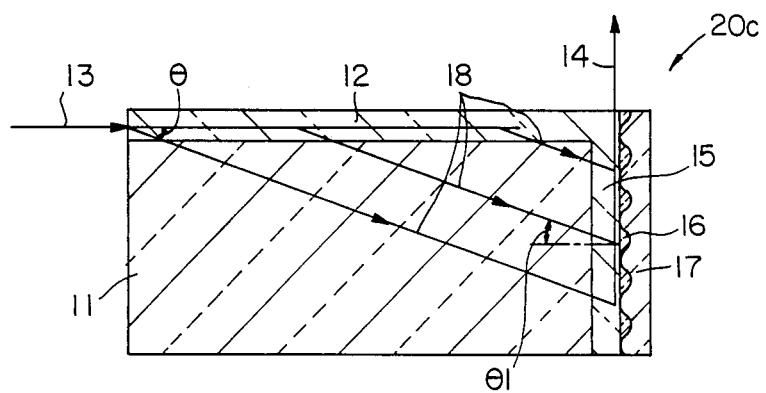
FIG. 5 is a sectional view showing another device for the changing of the wavelength of light of this invention.
Figure 6:
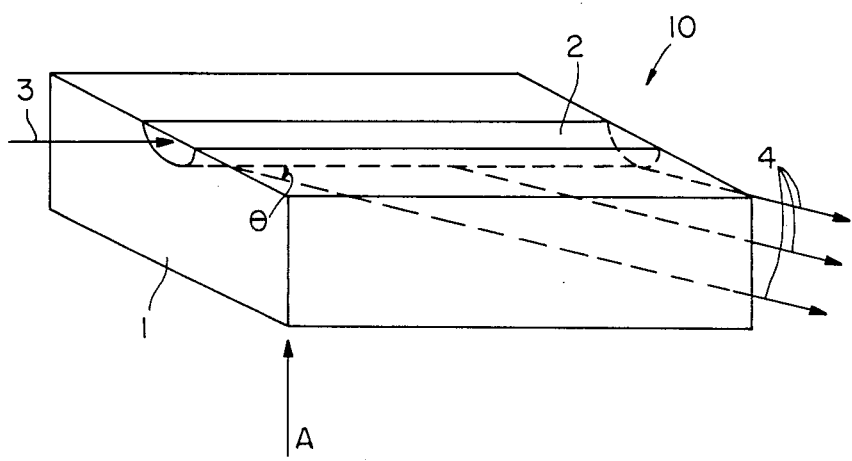
FIG. 6 is a perspective view showing a conventional device for the changing of the wavelength of light.

FIG. 5 shows another device 20c for the changing of the wavelength of light of this invention, which comprises optical waveguides 12 and 15, a grating layer 16, and a cladding layer 17 in the same way as for the device 20b of Example 3. The grating layer 16 is formed so as to satisfy the relationship shown above in Equation 1 and Inequality 2 for the grating period Λ. The device 20c for the changing of the wavelength of light that is made in this way, produces an output light 14 that proceeds in the upward direction at a 90° angle to the laser light 13 that is incident upon the device 20c.

In the examples given above, LiNbO$_3$ crystals were used for non-linear optical crystals 11, but it is also possible to use LiTaO$_3$ crystals or the like instead. Moreover, an optical waveguide 15 that is a flat optical waveguide was disclosed as a second optical waveguide, but it can be formed to be three-dimensional as a second optical waveguide. Moreover, a cladding layer 17 made of the material SiO$_2$ was formed to protect that grating layer 16, but this cladding layer 17 is not essential to this invention, and it may be omitted. When the cladding layer 17 is omitted, the refraction index of the atmosphere can be used for the refraction index $n_s$ for cladding layer 17 that appears in Equation 1 and Inequality 2. In order to obtain a yet higher introduction efficiency with which the harmonic light 18 is introduced into the second optical waveguide, a grating layer is formed that has been blazed, whereby an output light 14 with greater intensity can be output.

In these examples, a grating coupler that is constituted by a grating layer was used as an introducing means, but it is also possible to use other kinds of introducing means such as a tapered coupler and the like. Moreover, laser light with a wavelength of 1.06 μm from an YAG laser was used as an input laser light, but other kinds of lasers such as a gas laser, semiconductor laser, etc., can be also used as the light source.

As mentioned above, harmonic light that is produced is introduced into the second optical waveguide by an introducing means and condensed inside the said second optical waveguide, and then the condensed harmonic light is output in the desired direction, resulting in a harmonic light with the desired intensity distribution.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A device for the changing of the wavelength of light comprising a non-linear optical crystal, first and second optical waveguides that are formed in said non-linear optical crystal, and an introducing means that is positioned adjacent to said second optical waveguide, said light being incident upon said first optical waveguide and propagated within said first optical waveguide, resulting in harmonic light that satisfies the phase-matching conditions, and said harmonic light being introduced, by said introducing means, into said second optical waveguide from which said harmonic light is output.

2. A device according to claim 1, wherein said introducing means is a grating layer with a diffraction grating period.

3. A device according to claim 1, wherein said introducing means is a tapered coupler.

4. A device according to claim 2, wherein the diffraction grating period of said grating layer is selected so as to satisfy the following equation:

$$n_S \sin \theta_1 = N + \frac{\lambda}{\Lambda} q \qquad (1)$$

wherein Λ is the diffraction grating period of said grating layer, $\theta_1$ is the incident angle at which said harmonic light is incident upon said grating layer, λ is the wavelength of said harmonic light, $n_S$ is the refraction index of the atmosphere, q is an integer, and N is the refraction index of said grating layer.

5. A device according to claim 2, which further comprises a cladding layer that is positioned on said grating layer.

6. A device according to claim 4, wherein the $n_S$ is the refraction index of said cladding layer.

7. A device according to claim 6, wherein the refraction index N of said grating layer and the diffraction grating period $\Lambda$ of the grating layer further satisfy the following relationship:

$$N + n_S > \lambda/\Lambda > N \quad (2)$$

* * * * *